No. 633,726. Patented Sept. 26, 1899.
A. MANCHESTER.
ARTIFICIAL FLY.
(Application filed May 5, 1899.)

(No Model.)

Witnesses:
Chas. P. Schmelz
Henry Bissell

Inventor
A. Manchester,
By his Attorney
F. A. Richards.

UNITED STATES PATENT OFFICE.

ALISON MANCHESTER, OF BARKHAMSTED, CONNECTICUT.

ARTIFICIAL FLY.

SPECIFICATION forming part of Letters Patent No. 633,726, dated September 26, 1899.

Application filed May 5, 1899. Serial No. 716,694. (No model.)

*To all whom it may concern:*

Be it known that I, ALISON MANCHESTER, a citizen of the United States, residing in Barkhamsted, in the county of Litchfield and State of Connecticut, have invented certain new and useful Improvements in Artificial Bait, of which the following is a specification.

This invention relates to artificial flies generally employed when fishing with rod and line; and it has for its object the provision of an article of the character mentioned in which the wings of the insect are imitated as closely as possible and movement may be imparted to the same when the device is whipped upon the surface of the the water, so as to give a lifelike appearance to the fly.

Figure 1:
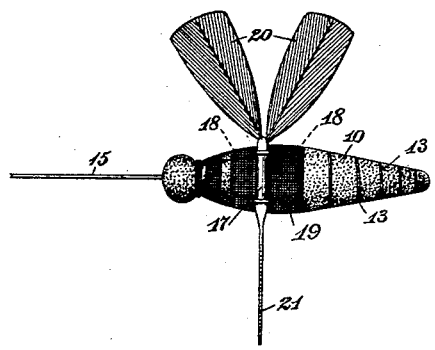
Figure 2:
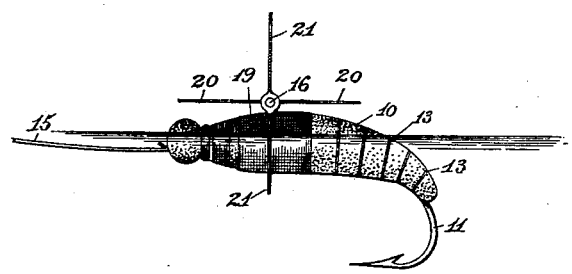
Figure 3:
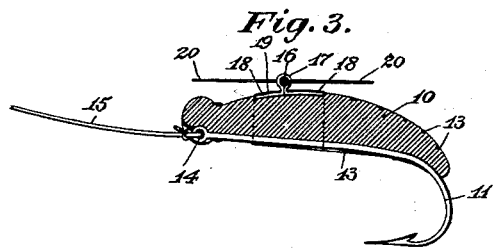

In the drawings, Figure 1 represents a top view of the fly. Fig. 2 is a side view of the same, and Fig. 3 is a longitudinal central section illustrating the manner in which the fly-body is secured to the hook.

Similar characters designate like parts in all the figures of the drawings.

In the drawings, 10 designates the body of the fly, made of proper material and adapted to float upon the surface of the water.

11 represents the hook, secured to the body 10 by means of the cord or light wire 13 and having at its forward end the usual eye or other device 14, to which the fishing-line 15 may be secured.

Upon the body 10 and at the side opposite to the hook 11 is a spindle 16, which is journaled in an eye 17, formed of light sheet metal or other material, having foot portions 18, by which and in connection with the winding of wire or cord 19 said spindle is firmly held in position relatively to the hook. At the ends of the spindle 16 are secured wings 20 21, respectively arranged at angles to each other, so that when one pair of wings, as 20, is in one position the wings 21 are in another position, and by these means no matter how the fly may be located on the water one of the wings 20 or 21 will always come into contact with the surface thereof, and consequently when the fly is whipped along said surface the resistance of the water against the wing in contact therewith will cause such spindle and therefore all the wings to rotate, as will be readily understood. As above stated, the hook 11 and spindle 16 are positioned at opposite sides of the body 10, so that said hook will serve as a keel to preserve the proper equilibrium of the body and the wings thereon above the water.

Although the spindle to which the wings are secured is illustrated as arranged horizontally on the body 10, yet the invention is not limited thereto, as said wings may be attached to a vertical spindle or to a spindle otherwise located in any suitable position upon the body without departing therefrom, the design of the invention being to provide a body representing the desired kind of flying insect with wings which by their movement will imitate the natural action of the insect.

Having thus described my invention, what I claim, and desire to secure by Letters Patent, is—

1. The combination with an artificial bait of a hook secured to the under side of said bait, whereby it serves as a keel therefor; and pairs of wings arranged at an angle to each other mounted for rotation on the top of the bait.

2. The combination with an artificial bait constructed of material adapted to float upon the water, of a hook secured to said bait below the line of its longitudinal axis and serving as a keel therefor; bearings mounted on the top of the bait; a spindle journaled in said bearings; and pairs of wings carried by said spindle, one pair of said wings being arranged at right angles to the other pair.

3. The combination with an artificial bait having a body portion shaped to represent the desired insect, said bait carrying a hook on its under side, of a spindle mounted in bearings secured to the bait; and wings, one pair of which is secured to one end, and the other pair to the other end, of said spindle, one pair of said wings being arranged at an angle to the other pair.

4. The combination with an artificial bait consisting of floatable material, of a hook secured to the bait; bearings having foot portions attached to the bait; and a spindle carrying wings journaled in said bearings.

5. The combination with an artificial bait carrying a hook, of bearings having foot portions secured by a winding of cord or wire to the top of said bait; a spindle journaled in said bearings; and pairs of wings, one pair arranged at an angle to the other pair, attached to the ends of the spindle.

ALISON MANCHESTER.

Witnesses:
  WM. H. C. BLODGETT,
  HENRY BISSELL.